(12) United States Patent
Weis

(10) Patent No.: US 11,671,000 B2
(45) Date of Patent: Jun. 6, 2023

(54) METHOD FOR OPERATING AN ELECTRICAL SUPPLY DEVICE AND ELECTRICAL SUPPLY DEVICE

(71) Applicant: Siemens Aktiengesellschaft, Munich (DE)

(72) Inventor: Benno Weis, Hemhofen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 168 days.

(21) Appl. No.: 17/416,297

(22) PCT Filed: Oct. 30, 2019

(86) PCT No.: PCT/EP2019/079641
§ 371 (c)(1),
(2) Date: Jun. 18, 2021

(87) PCT Pub. No.: WO2020/126180
PCT Pub. Date: Jun. 25, 2020

(65) Prior Publication Data
US 2022/0077758 A1 Mar. 10, 2022

(30) Foreign Application Priority Data
Dec. 19, 2018 (EP) .................................. 18214039

(51) Int. Cl.
*H02M 1/00* (2006.01)
*H02M 1/44* (2007.01)

(52) U.S. Cl.
CPC ....... *H02M 1/0009* (2021.05); *H02M 1/0016* (2021.05); *H02M 1/44* (2013.01)

(58) Field of Classification Search
CPC ..... H02M 1/0009; H02M 1/0016; H02M 1/44
See application file for complete search history.

(56) References Cited

U.S. PATENT DOCUMENTS 5,751,138 A 5/1998 Venkata et al.
6,366,483 B1 4/2002 Ma et al.
(Continued)

OTHER PUBLICATIONS

PCT International Search Report and Written Opinion of International Searching Authority dated Feb. 20, 2020 corresponding to PCT International Application No. PCT/EP2019/079641 filed Oct. 30, 2019.

*Primary Examiner* — Jue Zhang
*Assistant Examiner* — Lakaisha Jackson
(74) *Attorney, Agent, or Firm* — Henry M. Feiereisen LLC

(57) ABSTRACT

An electrical supply device is connected on a network side to an electrical supply network and includes a frequency converter having a network-side power converter and an intermediate circuit, and a network filter, which is connected upstream of the network-side power converter. In a method for operating the electrical supply device, during a pulse-blocking operating state of the frequency converter, a check is carried out for the presence of a dangerous state of the network filter, and only in the presence of the dangerous state, only the network-side power converter is actuated such that a network perturbation causing the dangerous state of the network filter is at least damped to protect the network filter from the dangerous state.

19 Claims, 1 Drawing Sheet

(56) References Cited

U.S. PATENT DOCUMENTS

| | | | |
|---|---|---|---|
| 2013/0170077 A1* | 7/2013 | Dillig | H02H 3/347 |
| | | | 361/18 |
| 2013/0235618 A1* | 9/2013 | Dillig | H02H 7/1216 |
| | | | 363/16 |
| 2013/0279214 A1 | 10/2013 | Takase et al. | |
| 2015/0210506 A1* | 7/2015 | Kattainen | B66B 5/02 |
| | | | 187/393 |
| 2019/0363533 A1* | 11/2019 | Schierling | G01R 31/52 |

* cited by examiner

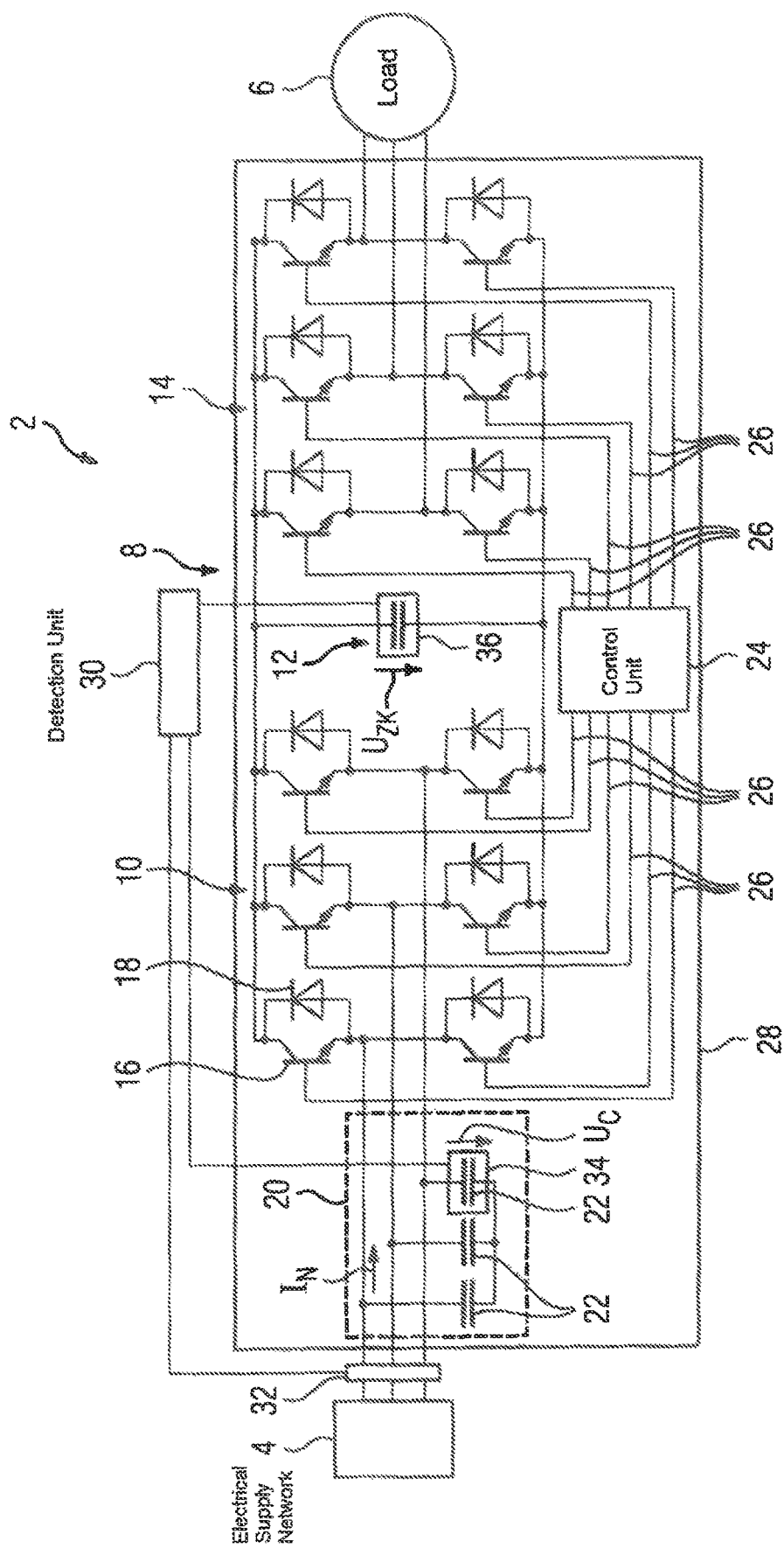

METHOD FOR OPERATING AN ELECTRICAL SUPPLY DEVICE AND ELECTRICAL SUPPLY DEVICE

CROSS-REFERENCES TO RELATED APPLICATIONS

This application is the U.S. National Stage of International Application No. PCT/EP2019/079641, filed Oct. 30, 2019, which designated the United States and has been published as International Publication No. WO 2020/126180 A1 and which claims the priority of European Patent Application, Serial No. 18214039.2, filed Dec. 19, 2018, pursuant to 35 U.S.C. 119(a)-(d).

BACKGROUND OF THE INVENTION

The invention relates to a method for operation of an electrical supply device and to an electrical supply device.

Use of non-linear loads, such as, for example, switching operating equipment, which is connected to an electrical supply network, results in voltage depressions, voltage distortions and, in general, additional losses (also referred to as system perturbations) being stored in the electrical supply network. The electrical supply network is likewise used as a coupling element between many different loads, which are each connected to the electrical supply network, so a network perturbation of a load connected to the supply network has an effect—in particular an adverse one—on other loads likewise connected to the supply network.

To keep system perturbations of this kind as low as possible network filters are conventionally connected between the electrical supply network and the non-linear loads. A unit comprising network filter and non-linear load will also be referred to as an electrical supply device below.

Network filters of this kind are also connected upstream of frequency converters, for example, in order to keep network perturbation, which is caused by the switching operation of the frequency converter, as low as possible and preferably to damp them completely.

Conventionally, the network filters, which are connected upstream of frequency converters, are designed as passive network filters, in other words these network filters do not have any actively actuatable switching elements. Instead, passive network filters of this kind have, for example, filter resistors and/or filter capacitors.

Passive filters of this kind are susceptible, in particular as a function of an operating state of the frequency converter, to system perturbations, however, which are generated, for example, by a different load and are conducted via the electrical supply network to the network filter.

SUMMARY OF THE INVENTION

Starting herefrom the invention is based on the object of disclosing a method for operation of an electrical supply device and an electrical supply device with the aid of which a network filter is adequately protected from system perturbations.

The object directed toward the method is inventively achieved by a method for operation of an electrical supply device as set forth hereinafter. Advantageous embodiments, developments and variants are the subject matter of the subclaims.

The electrical supply device is connected on the network side to an electrical supply network.

The electrical supply network is preferably a three-phase system with a voltage in the range of 300V to 500V.

The electrical supply device has here a frequency converter, which has a network-side power converter and an intermediate circuit.

Furthermore, the electrical supply device, as already mentioned in the introduction, has a network filter, which is connected upstream of the network-side power converter. Here, connected upstream is taken to mean that, starting from the electrical supply network viewed in the direction of frequency converter, an electrical current flowing from the electrical supply network first flows through the network filter and then into the frequency converter.

During a pulse-blocking operating state, a check is carried out as to whether a dangerous state is present for the network filter. Here the pulse-blocking operating state, also referred to as just a pulse block, is taken to mean an operating state of the frequency converter in which no switching pulses are transferred to switching elements typically arranged inside the frequency converter.

The pulse block operating state is, in particular, a "standby mode", therefore. The frequency converter is inactive in the pulse-blocking operating state, therefore.

Here the dangerous state is specifically taken to mean a state caused due to the system perturbations already mentioned in the introduction in which the network filter can be destroyed. The potential destruction of the network filter in the dangerous state is based here on impermissibly high voltages and/or currents, which occur in this dangerous state and can lead to a destruction of the network filter.

Only the network-side power converter is actuated, only in the case where the dangerous state is present, in such a way that a network perturbation causing the dangerous state of the network filter is at least damped and preferably completely attenuated. The network filter is protected from the dangerous state, therefore.

This embodiment is based, in particular, on the idea that, conventionally, specifically in the pulse-blocking operating state, the frequency converter, owing to its "inactive state", is not actively actuated in such a way that system perturbations, which are the cause of the dangerous state, are damped or even completely attenuated.

Actuating the network-side power converter when the dangerous state is present also provides protection for the network filter from the dangerous state in the pulse-blocking operating state too, however, without canceling the pulse-blocking operating state as a whole.

Furthermore, this achieves particularly low-loss protection of the network filter. In other words, because the network-side power converter is actuated and activated, therefore, only when the dangerous state is present for the network filter, the power converter generates electrical losses only in this actuated state too. If no dangerous state is present for the network filter during the pulse-blocking operating state the frequency converter remains in this inactive operating state and does not consume any electrical energy and/or does not generate any electrical losses, therefore.

Furthermore, expensive and/or additional protective elements, such as, for example, damping resistors, inside the network filter can be omitted. Conventionally, additional protective elements of this kind namely lead not only to a more expensive embodiment of the network filter, but also generate undesirable, high electrical losses.

Preferably, the network-side power converter is automatically actuated when the dangerous state is present. In other words, the network-side power converter is independently, in other words, autonomously, without external switching command. In other words, no active actuating, for example by a person, is required. A particularly simple and low-cost implementation as well as time-saving actuation of the network-side power converter when the dangerous state is present is achieved hereby.

Expediently, the frequency converter is connected on the load side to an electrical load. Alternatively, the frequency converter is connected to a plurality of electrical loads. Here the electrical bad is taken to mean preferably one or more electrical machines, for example electric motors.

During the pulse-blocking operating state, the electrical load connected on the load side is preferably switched in a power-free manner, so, for example, the load designed as an electric motor is protected from a restart.

Because only the network-side power converter is actuated when the dangerous state is present, the power-free switching of the electrical load expediently continues to be ensured during the pulse-blocking operating state hereby.

Preferably, the network filter is a passive network filter with at least one filter capacitor. Here the passive network filter is taken to mean a network filter, which, specifically, does not have any active elements, such as, for example, switching elements. As an alternative to the filter capacitor the passive network filter has a filter capacitor bank, which for its part has a plurality of filter capacitors.

In the case where no electrical load is connected to the frequency converter on the load side, this, and in particular the electrical supply device, is also referred to as an active filter since the above-described active switching elements, which are missing in the case of the passive filter, are then implemented by the switching elements of the frequency converter.

According to a preferred embodiment, the presence of the dangerous state is identified by a detection of an intermediate circuit overvoltage inside the intermediate circuit of the frequency converter. Specifically, a detection unit for detection of the intermediate circuit overvoltage is used here. The detection unit is preferably designed as a voltage measuring element. Alternatively, it has a voltage measuring element of this kind or, as a further alternative, is electrically connected to a voltage measuring element of this kind. This embodiment of the identification of the presence of the dangerous state is particularly preferred since a voltage inside the intermediate circuit of the frequency converter is conventionally detected in the framework of a regulation of the frequency converter, and the intermediate circuit overvoltage inside the intermediate circuit can be detected particularly easily, therefore. Furthermore, additional components are omitted here.

Alternatively or in addition, the presence of the dangerous state is identified by a detection of a capacitor overvoltage at the filter capacitor of the network filter. Alternatively or in addition, the detection unit is designed here to detect the capacitor overvoltage at the filter capacitor and has for this purpose either a voltage measuring element, is alternatively designed as a voltage measuring element of this kind or is electrically connected to a voltage measuring element of this kind as a further alternative.

Furthermore, alternatively or in addition, the presence of the dangerous state is identified by a detection of a network overcurrent inside the supply network. Preferably, the detection unit is likewise used here, which, according to this alternative or additional variant, has either a current measuring element, or is designed as such an ammeter or as a further alternative hereto is electrically connected to a current measuring element of this kind.

Here the two above-described overvoltages and the above-described overcurrent are preferably to be taken to mean threshold values for voltages to be determined and/or the current to be determined, on the exceeding of which the presence of the dangerous state is identified. The voltage threshold value lies, for example, preferably about 10%, and specifically about 15%, above the regular operating voltage of the respective electrical load.

Preferably, the frequency converter also has a load-side power converter. The load-side power converter is expediently arranged, and specifically electrically connected, between the intermediate circuit and, for example, a load connected on the load side to the frequency converter. The load-side power converter serves here preferably to provide an alternating current for the load connected on the load side.

According to a preferred embodiment, the frequency converter is designed as an Active Front End. Active Front End converters of this kind have, specifically in the network-side power converter, switching elements by means of which they are designed and adapted to damp variations in voltage and/or current on the part of the supply network and/or on the part of the frequency converter, for example in the form of an energy recovery in the electrical supply network. Similarly, the design of the network filter as a passive network filter is based on the consideration that Active Front End converters conventionally generate such variations in voltage and/or current (for example in the form of harmonic components), which can be damped solely with passive network filters of this kind.

With the design of the frequency converter as an Active Front End converter it is possible, therefore to protect the network filter particularly easily from the dangerous state by actuation of the network-side power converter when the dangerous state is present for the network filter.

Expediently, the frequency converter and the network filter are arranged in a shared housing. The advantage here can be seen in a particularly advantageous implementation of the supply device.

Preferably, the network-side power converter is automatically actuated by means of a control unit when the dangerous state for the network filter is present. Preferably, a control unit is used here, which also serves during normal operation to actuate the frequency converter. The control unit is preferably part of the supply device here and actuates the switching elements arranged inside network-side power converter and the load-side power converter respectively with switching pulses.

A further advantage here is that, as already mentioned, no additional elements are required, in particular with regard to the actuation of the network-side power converter when the dangerous state is present.

The object directed toward the electrical supply device is inventively achieved by an electrical supply device as set forth hereinafter.

The electrical supply device is designed here for connection to an electrical supply network. Furthermore, the electrical supply device is designed, in particular, for carrying out the method described above.

For this, the electrical supply device has a frequency converter, which has a network-side power converter and an intermediate circuit.

Furthermore, the electrical supply device has a network filter, which is connected upstream of the network-side power converter. The frequency converter is adapted in such a way here as to switch, for example, a (load-side) connected electrical load during a pulse-blocking operating state in a power-free manner.

Furthermore, a detection unit is provided, which is adapted in such a way as to check and to identify whether a dangerous state is present. This check is carried out either by way of a check of a voltage at a filter capacitor of the network filter or by monitoring a network current of the electrical supply network. Particularly preferably, the check for the dangerous state is carried out by way of a check of a voltage inside the intermediate circuit of the frequency converter, however.

The frequency converter is also adapted to acuate only the network-side power converter, only in the case where the dangerous state is present, in such a way that a network perturbation causing the dangerous state of the network filter is at least damped. Preferably, the frequency converter is adapted here to completely damp the network perturbation.

The network filter is protected from the dangerous state hereby.

Preferably, the frequency converter also has a bad-side power converter.

The advantages and preferred embodiments stated with regard to the method are logically to be transferred to the electrical supply device, and vice versa.

BRIEF DESCRIPTION OF THE DRAWING

An exemplary embodiment of the invention will be explained in more detail below with reference to the FIGURE. In a partially highly simplified representation:

FIG. 1 shows a schematized circuit diagram of an electrical supply device.

DETAILED DESCRIPTION OF PREFERRED EMBODIMENTS

FIG. 1 shows a schematized circuit diagram of an electrical supply device 2, which is connected on the network side to an electrical supply network 4 and in the exemplary embodiment to an electrical load 6 on the bad side. A (load-side) connection of the electrical bad 6 is not imperative, however, and is used in the exemplary embodiment merely for better understanding.

The electrical supply network 4 is preferably a three-phase system, which is represented in FIG. 1 merely in a schematized manner by means of a rectangle. In the exemplary embodiment according to FIG. 1, the electrical load 6 is an electrical machine, specifically an electric motor.

Furthermore, the electrical supply device 2 has a frequency converter 8, which has a network-side power converter 10, an intermediate circuit 12 and a load-side power converter 14. Both the network-side power converter 10 and the load-side power converter 14 each have six switching elements 16 designed, for example, as semiconductor switches.

Parallel to each switching element 16 is a diode 18 with its flow direction arranged counter to the forward direction of the respective switching element 16.

The general functional principle of the frequency converter 8 will not be discussed here.

The electrical supply device 2 also has a network filter 20, which is connected upstream of the network-side power converter 10.

The network filter 20 also preferably has a filter capacitor 22, in the exemplary embodiment three filter capacitors 22. Here one filter capacitor 22 respectively is provided for one phase of the three-phase electrical supply network 4. The network filter 20 can also have further passive elements such as chokes, resistors or diodes. Mechanical switch components such as, for example, contactors can alternatively also be arranged in the network filter 20.

Furthermore, the electrical supply device 2 in the exemplary embodiment has a control unit 24, which is adapted in such a way as to actuate the two power converters 10, 14, and specifically their switching elements 16, with switching pulses via control lines 26.

Both the control unit 24 and the frequency converter 8 are arranged in a shared housing 28.

The electrical supply device 2 and, in particular, the frequency converter 8 is adapted in such a way as to switch the electrical load 6 present in the exemplary embodiment, in a pulse-blocking operating state, via the load-side power converter 14 in a power-free manner. Furthermore, the frequency converter 8 is adapted in such a way as to actuate only the network-side power converter 10 by means of the control unit 24, only in the case where a dangerous state is present for the network filter 20, in such a way that the network filter 20 is protected from the dangerous state.

For detection and, in particular, identification of the dangerous state the electrical supply device 2 in the exemplary embodiment has a detection unit 30. The presence of the dangerous state is identified by means of the detection unit 30, for example by detection of a network overcurrent $I_N$. For this, a current measuring element 32 is provided in the exemplary embodiment, which measures the network current and transmits this value to the detection unit 30. The dangerous state is present in this case when the network current of the electrical supply network 4 exceeds a specified threshold value, therefore.

Furthermore, it is provided in the exemplary embodiment that the dangerous state for the network filter 20 is identified in such a way that a capacitor overvoltage $U_C$ is detected at one of the filter capacitors 22 and is transmitted to the detection unit 30. If the voltage at one of the filter capacitors 22 exceeds a specified value, the dangerous state for the network filter 20 is present. A first voltage measuring element 34 is arranged inside the network filter 20 for detection of the capacitor overvoltage $U_C$, which drops at one of the filter capacitors 22.

As a third and particularly preferred variant for identification of the dangerous state for the network filter 20 it is provided in the exemplary embodiment that an intermediate circuit overvoltage $U_{ZK}$ of the intermediate circuit 12 is detected. Here a second voltage measuring element 36 is arranged inside the intermediate circuit 12, and this is connected to the detection unit 30.

As a particularly preferred variant, the detection of the intermediate circuit overvoltage $U_{ZK}$ Is based on the idea that a voltage of this kind is detected anyway for a regulation during normal operation of the frequency converter 8, and additional components can be omitted, therefore. In other words, the second voltage measuring element 36 is not arranged in the frequency converter 8 in addition to the identification of the dangerous state on the basis of the intermediate circuit overvoltage $U_{ZK}$, therefore. Instead, a voltage measuring element arranged as standard in the intermediate circuit 12 is used as the second voltage measuring element 36.

When the dangerous state is present, the detection unit 30 transmits a signal to the control unit 24, so this preferably automatically, in other words independently, transmits an actuation signal to the switching elements 16 of the network-side power converter 10, so this is actuated hereby in such a way that the network perturbation causing the dangerous state is preferably damped from the electrical supply network 4 and in particular completely compensated, so the network filter 20 is protected from the dangerous state and against destruction, therefore.

The Invention is not limited to the exemplary embodiment described above. Instead, a person skilled in the art can derive other variants of the invention herefrom without departing from the subject matter of the invention. In particular, all individual features described in connection with the exemplary embodiment can also be combined with each other in different ways, moreover, without departing from the subject matter of the invention.

In particular, the invention can also be applied to frequency converters, which only have a passive network filter, a (active) network-side power converter and an intermediate circuit. In this case, the frequency converter forms either an active network filter or an electrical supply device for a direct current (DC) network.

What is claimed is:

1. A method for operation of an electrical supply device, which is connected on a network side to an electrical supply network and includes a frequency converter having a network-side power converter and an intermediate circuit, and a network filter, which is connected upstream of the network-side power converter, said method comprising:
    during a pulse-blocking operating state of the frequency converter, checking for the presence of a dangerous state of the network filter; and
    only in the presence of the dangerous state, actuating only the network-side power converter such that a network perturbation causing the dangerous state of the network filter is at least damped to protect the network filter from the dangerous state.

2. The method of claim 1, wherein the network-side power converter is automatically actuated when the dangerous state is present.

3. The method of claim 1, wherein the network filter is a passive network filter including a filter capacitor.

4. The method of claim 3, wherein the presence of the dangerous state is identified by a detection unit through detection of a capacitor overvoltage at the filter capacitor.

5. The method of claim 1, wherein the presence of the dangerous state is identified by a detection unit through detection of an intermediate circuit overvoltage inside the intermediate circuit of the frequency converter.

6. The method of claim 1, wherein the presence of the dangerous state is identified by a detection unit through detection of an overcurrent inside the supply network.

7. The method of claim 1, wherein the frequency converter includes a load-side power converter.

8. The method of claim 1, wherein the frequency converter is designed as an Active Front End.

9. The method of claim 1, further comprising arranging the frequency converter and the network filter in a shared housing.

10. The method of claim 1, wherein the network-side power converter is automatically actuated by a control unit when the dangerous state is present.

11. An electrical supply device for connection to an electrical supply network, said electrical supply device comprising:
    a frequency converter including a network-side power converter and an intermediate circuit;
    a network filter connected upstream of the network-side power converter; and
    a detection unit configured to check, during a pulse-blocking-operating state of the frequency converter, the presence of a dangerous state for the network filter,
    wherein only in the presence of the dangerous state, the frequency converter actuates only the network-side power converter such that a network perturbation causing the dangerous state of the network filter is at least damped to protect the network filter from the dangerous state.

12. The electrical supply device of claim 11, wherein the frequency converter includes a load-side power converter.

13. The electrical supply device of claim 11, wherein the network filter is a passive network filter including a filter capacitor.

14. The electrical supply device of claim 13, wherein the detection unit is configured to detect a capacitor overvoltage at the filter capacitor.

15. The electrical supply device of claim 11, wherein the detection unit is configured to detect an intermediate circuit overvoltage inside the intermediate circuit of the frequency converter.

16. The electrical supply device of claim 11, wherein the detection unit is configured to detect an overcurrent inside the supply network.

17. The electrical supply device of claim 11, wherein the frequency converter is designed as an Active Front End.

18. The electrical supply device of claim 11, further comprising a shared housing for arrangement of the frequency converter and the network filter.

19. The electrical supply device of claim 11, further comprising a control unit configured to automatically actuate the network-side power converter when the dangerous state is present.

* * * * *